United States Patent [19]
MacDowell

[11] Patent Number: 5,813,130
[45] Date of Patent: Sep. 29, 1998

[54] ELECTRICAL GEM BOX LEVELING TEMPLATE

[76] Inventor: Robert P. MacDowell, 65 Florence St., Central Islip, N.Y. 11722

[21] Appl. No.: 851,215

[22] Filed: May 5, 1997

[51] Int. Cl.⁶ ........................................... G01B 5/00
[52] U.S. Cl. ........................... 33/528; 33/DIG. 10
[58] Field of Search ................ 33/528, DIG. 10, 33/613

[56] References Cited

U.S. PATENT DOCUMENTS

| | | | |
|---|---|---|---|
| D. 298,421 | 11/1988 | Tyroff | D10/69 |
| 2,540,032 | 1/1951 | Johnson et al. | 33/528 |
| 2,733,513 | 2/1956 | Gatineau | 33/528 |
| 3,123,918 | 3/1964 | Crabtree | 33/528 |
| 3,842,510 | 10/1974 | Elliott | 33/528 |
| 4,228,592 | 10/1980 | Badger | 33/DIG. 10 |
| 4,750,271 | 6/1988 | Ericksen | 33/613 |
| 4,793,069 | 12/1988 | McDowell | 33/528 |
| 4,901,447 | 2/1990 | Gottschalk | 33/613 |
| 5,111,593 | 5/1992 | Gehen, Sr. | 33/613 |
| 5,222,303 | 6/1993 | Jardine | 33/528 |

Primary Examiner—Thomas B. Will
Attorney, Agent, or Firm—Richard L. Miller, P.E.

[57] ABSTRACT

An electrical gem box leveling template that is abutable against a wall and utilized for marking a position on the wall at which a gem box is to be mounted in the wall that is between studs in the wall. The template includes a plate, a first spirit level, and a second spirit level. The first spirit level is disposed on the plate and assures horizontal leveling of the electrical gem box leveling template. And, the second spirit level is disposed on the plate and assures vertical leveling of the electrical gem box leveling template.

6 Claims, 1 Drawing Sheet

ELECTRICAL GEM BOX LEVELING TEMPLATE

BACKGROUND OF THE INVENTION

1. Field of the Invention

The present invention relates to a template. More particularly, the present invention relates to an electrical gem box leveling template.

2. Description of the Prior Art

When a switch or outlet or any other gem box device is required to be installed into a finished wall, electricians have to hold the box to the wall and trace its contour.

Numerous innovations for gem box positioning devices have been provided in the prior art that will be described. Even though these innovations may be suitable for the specific individual purposes to which they address, however, they differ from the present invention.

FOR EXAMPLE, U.S. Pat. No. Des. 298,421 to Tyroff teaches the ornamental design for an electrical outlet box leveling template.

ANOTHER EXAMPLE, U.S. Pat. No. 4,750,271 to Ericksen teaches a template for use in positioning an electrical outlet box or switch box with respect to a building stud. The template releasibly supports the electrical box at a selected height and position forwardly of the face of the vertical stud.

STILL ANOTHER EXAMPLE, U.S. Pat. No. 4,901,447 to Gottschalk teaches a device for positioning an outlet or switch box on a wall member for connection and use in the electrical system. The device has parts to grip and locate a box of any preferred form in various positions both inwardly and outwardly and upwardly and downwardly while the box is being secured in its preferred location within the wall construction.

FINALLY, YET ANOTHER EXAMPLE, U.S. Pat. No. 5,111,593 to Gehen, Sr. teaches a template for the uniform positioning of electrical boxes in walls of buildings. The template has a slidable vertical adjusting extension that can be locked in place when the appropriate height of installation is determined. The template also has depth adjusting screws which determine how deep on a stud the template will be nailed. On the front face of the template are handles and on the back face of the template is a clamp which holds the box securely in position while nailing a stud.

It is apparent that numerous innovations for gem box positioning devices have been provided in the prior art that are adapted to be used. Furthermore, even though these innovations may be suitable for the specific individual purposes to which they address, however, they would not be suitable for the purposes of the present invention as heretofore described.

SUMMARY OF THE INVENTION

ACCORDINGLY, AN OBJECT of the present invention is to provide an electrical gem box leveling template that avoids the disadvantages of the prior art.

ANOTHER OBJECT of the present invention is to provide an electrical gem box leveling template that is simple and inexpensive to manufacture.

STILL ANOTHER OBJECT of the present invention is to provide an electrical gem box leveling template that is simple to use.

BRIEFLY STATED, YET ANOTHER OBJECT of the present invention is to provide an electrical gem box leveling template that is abutable against a wall and utilized for marking a position on the wall at which a gem box is to be mounted in the wall that is between studs in the wall. The template includes a plate, a first spirit level, and a second spirit level. The first spirit level is disposed on the plate and assures horizontal leveling of the electrical gem box leveling template. And, the second spirit level is disposed on the plate and assures vertical leveling of the electrical gem box leveling template.

The novel features which are considered characteristic of the present invention are set forth in the appended claims. The invention itself, however, both as to its construction and its method of operation, together with additional objects and advantages thereof, will be best understood from the following description of the specific embodiments when read and understood in connection with the accompanying drawing.

BRIEF DESCRIPTION OF THE DRAWING

The figures on the drawing are briefly described as follows.

DETAILED DESCRIPTION OF THE PREFERRED EMBODIMENT

Referring now to the figures in which like numerals indicate like parts, and particularly to FIGS. 1–5, the electrical gem box leveling template of the present invention is shown generally at 10.

Figure 1:
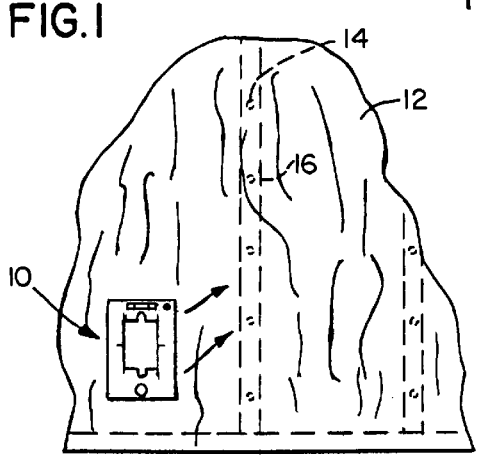
FIG. 1 is a diagrammatic front elevational view of the present invention being positioned on a typical wall and being utilized to locate nails in a stud prior to marking the opening for a gem box.

As shown in FIG. 1, the electrical gem box leveling template 10 is being positioned on a typical wall 12 and being utilized to locate nails 14 in a wood stud 16 in the typical wall 12 prior to marking an opening 18 (see FIG. 5) in the typical wall 12 for a gem box (not shown) so as to allow the opening 18 (see FIG. 5) in the typical wall 12 to be positioned between the wood studs 16 in the typical wall 12 so as to allow the gem box (not shown) to be attached between the wood studs 16 in the typical wall.

Figure 2:
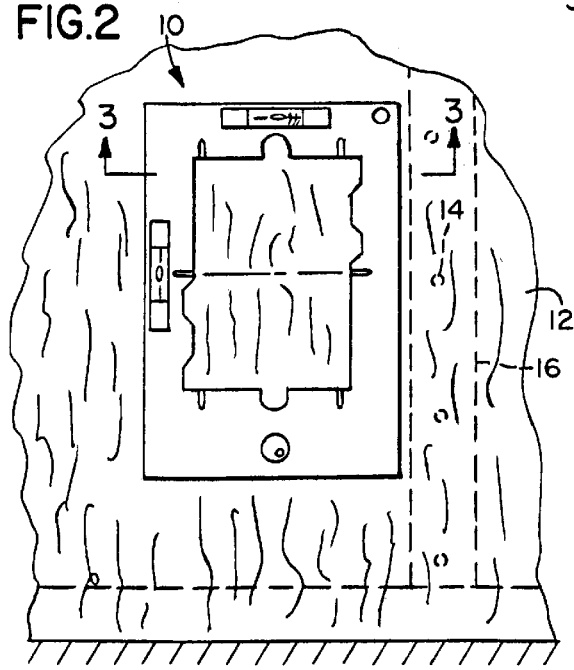
FIG. 2 is an enlarged diagrammatic front elevational view of the present invention positioned on the typical wall.
Figure 3:
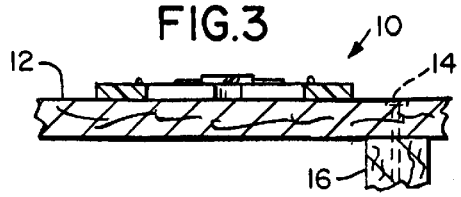
FIG. 3 is an enlarged cross sectional view taken on line 3—3 in FIG. 2.

As shown in FIGS. 2 and 3, the electrical gem box leveling template 10 is abutted against the typical wall 12, adjacent the wood stud 16 in the typical wall 12.

Figure 4:
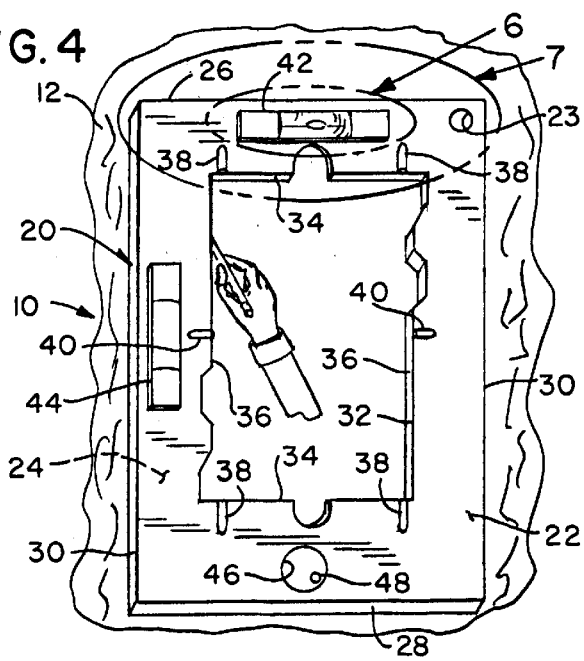
FIG. 4 is an enlarged exaggerated diagrammatic front elevational view of the present invention positioned on the typical wall and having an opening for the gem box being marked.

As shown in FIG. 4, the electrical gem box leveling template 10 is being utilized to mark the opening 18 (see FIG. 5) in the typical wall 12 for the gem box (not shown).

Figure 5:
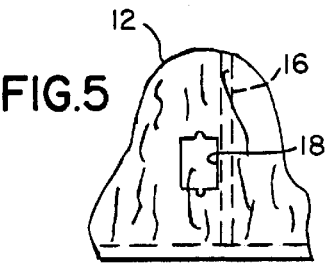
FIG. 5 is a diagrammatic front elevational view of the opening marked on the typical wall subsequent to removal of the present invention.

As shown in FIG. 5, the opening 18 in the typical wall 12 for the gem box (not shown) has been marked on the typical wall 12, subsequent to removal of the electrical gem box leveling template 10.

Figure 6:
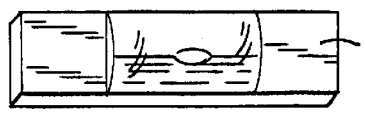
FIG. 6 is an enlarged diagrammatic perspective view of the area generally enclosed by the dotted ellipse identified by arrow 6 in FIG. 4.
Figure 7:
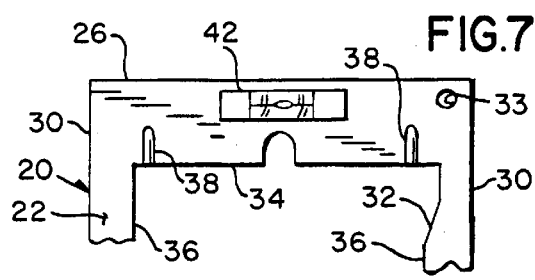
FIG. 7 is an enlarged diagrammatic perspective view of the area generally enclosed by the dotted ellipse identified by arrow 7 in FIG. 4.

The configuration of the electrical gem box leveling template 10 can best be seen in FIGS. 4, 6, and 7, and as such will be discussed with reference thereto.

The electrical gem box leveling template 10 includes a plate 20 that is thin plastic and rectangular-shaped. The plate 20 has a front face 22, a back face 24 that abuts against the typical wall 12 when the electrical gem box leveling template 10 is being utilized, a top edge 26 that is horizontally-oriented, a bottom edge 28 that is horizontally-oriented, and a pair of longitudinal edges 30 that are vertically-oriented.

The plate 20 further has a throughopening 32 that extends concentrically therethrough, from the front face 22 of the plate 20 to the back face 24 of the plate 20, and is shaped to conform to the gem box (not shown). The throughopening 32 in the plate 20 is generally rectangular-shaped and is defined by a pair of horizontal edges 34 and a pair of vertical edges 36.

The plate 20 further has a throughbore 23 that extends therethrough, from the front face 22 of the plate 20 to the back face 24 of the plate 20, at a corner thereof, and allows the electrical gem box leveling template 10 to be hung.

The front face 22 of the plate 20 has raised lines 38 thereon that are slender and extend collinearly from the pair of vertical edges 36 of the throughopening 32 in the plate 20 to short of the top edge 26 of the plate 20 and to short of the bottom edge 28 of the plate 20, and provide alignment when gem boxes are to be ganged together.

The front face 22 of the plate 20 further has raised center lines 40 thereon that are slender and extend perpendicularly from the pair of vertical edges 36 of the throughopening 32 in the plate 20, at their midpoints, to short of the pair of vertical edges 30 of the plate 20, and provide exact measurements.

The electrical gem box leveling template 10 further includes a first spirit level 42 that is horizontally-oriented and disposed on the front face 22 of the plate 20, between and parallel to, the top edge 26 of the plate 20 and an uppermost horizontal edge 34 of the pair of horizontal edges 34 of the throughopening 32 in the plate 20, at their midpoints, and assures horizontal leveling of the electrical gem box leveling template 10.

The electrical gem box leveling template 10 further includes a second spirit level 44 that is vertically-oriented and disposed on the front face 22 of the plate 20, between and parallel to, a longitudinal edge 30 of the pair of longitudinal edges 30 of the plate 20 and an adjacent vertical edge 36 of the pair of vertical edges 36 of the throughopening 32 in the plate 20, at their midpoints, and assures vertical leveling of the electrical gem box leveling template 10.

The electrical gem box leveling template 10 further includes a bubble enclosure 46 that is clear plastic and hemispherically-shaped. The bubble enclosure 46 is disposed on the front face 22 of the plate 20, between the bottom edge 28 of the plate 20 and a lowermost horizontal edge 34 of the pair of horizontal edges 34 of the throughopening 32 in the plate 20, at their midpoints.

The bubble enclosure 46 houses a magnet 48 that is freely movable therein, and allows location of the nails 14 in the wood stud 16 in the typical wall 12 or a steel stud by being attracted thereto.

Figure 8:
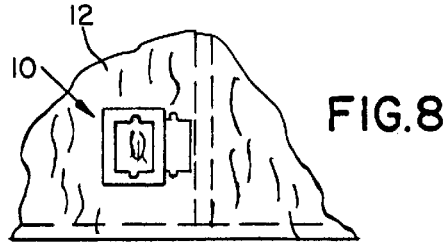
FIG. 8 is a diagrammatic front elevational view of the present invention positioned on the typical wall and being utilized to mark a second opening for tandem gem boxes.

As shown in FIG. 8, the electrical gem box leveling template 10 is positioned on the typical wall 12 and being utilized to mark a second opening for tandem gem boxes (not shown).

It will be understood that each of the elements described above, or two or more together, may also find a useful application in other types of constructions differing from the types described above.

While the invention has been illustrated and described as embodied in an electrical gem box leveling template, however, it is not limited to the details shown, since it will be understood that various omissions, modifications, substitutions and changes in the forms and details of the device illustrated and its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute characteristics of the generic or specific aspects of this invention.

The invention claimed is:

1. An electrical gem box leveling template abutable against a wall and utilized to mark a position on the wall at which a gem box is to be mounted in the wall between studs, comprising:

a) a plate; said plate being thin plastic and rectangular-shaped, and having a front face, a back face abutting against the wall when said electrical gem box leveling template is being utilized, a top edge being horizontally-oriented, a bottom edge being horizontally-oriented, and a pair of longitudinal edges being vertically-oriented; said plate further having a throughopening extending concentrically therethrough, from said front face of said plate to said back face of said plate, and being shaped to conform to the gem box; said throughopening in said plate being generally rectangular-shaped and defined by a pair of horizontal edges and a pair of vertical edges;

b) a first spirit level disposed on said plate for assuring horizontal leveling of said electrical gem box leveling template;

c) a second spirit level disposed on said plate for assuring vertical leveling of said electrical gem box leveling template;

d) a bubble enclosure being clear plastic and hemispherically-shaped and disposed on said front face of said plate, between said bottom edge of said plate and a lowermost horizontal edge of said pair of horizontal edges of said throughopening in said plate, at their midpoints; and e) a magnet housed in said bubble enclosure and having 360 degrees of freedom therein by virtue of said bubble enclosure being clear and hemispherically-shaped and said magnet being freely movable in said bubble enclosure for allowing location of the nails in the wood stud in the wall and the steel stud in the wall by being attracted thereto regardless of the angle said plate is oriented on the wall.

2. The template as defined in claim 1, wherein said plate further has a throughbore that extends therethrough, from said front face of said plate to said back face of said plate, at a corner thereof, and allows said electrical gem box leveling template to be hung.

3. The template as defined in claim 1, wherein said front face of said plate has raised lines thereon that are slender and extend collinearly from said pair of vertical edges of said throughopening in said plate, to short of said top edge of said plate and to short of said bottom edge of said plate, and provide alignment when gem boxes are to be ganged together.

4. The template as defined in claim 1, wherein said plate further has raised center lines thereon that are slender and extend perpendicularly from said pair of vertical edges of said throughopening in said plate, at their midpoints, to short of said pair of vertical edges of said plate, and provide exact measurements.

5. The template as defined in claim 1, wherein said first spirit level is horizontally-oriented and disposed on said front face of said plate, between and parallel to, said top edge of said plate and an uppermost horizontal edge of said pair of horizontal edges of said throughopening in said plate, at their midpoints.

6. The template as defined in claim 1, wherein said second spirit level is vertically-oriented and disposed on said front face of said plate, between and parallel to, a longitudinal edge of said pair of longitudinal edges of said plate and an adjacent vertical edge of said pair of vertical edges of said throughopening in said plate, at their midpoints.

* * * * *